Figure 1:
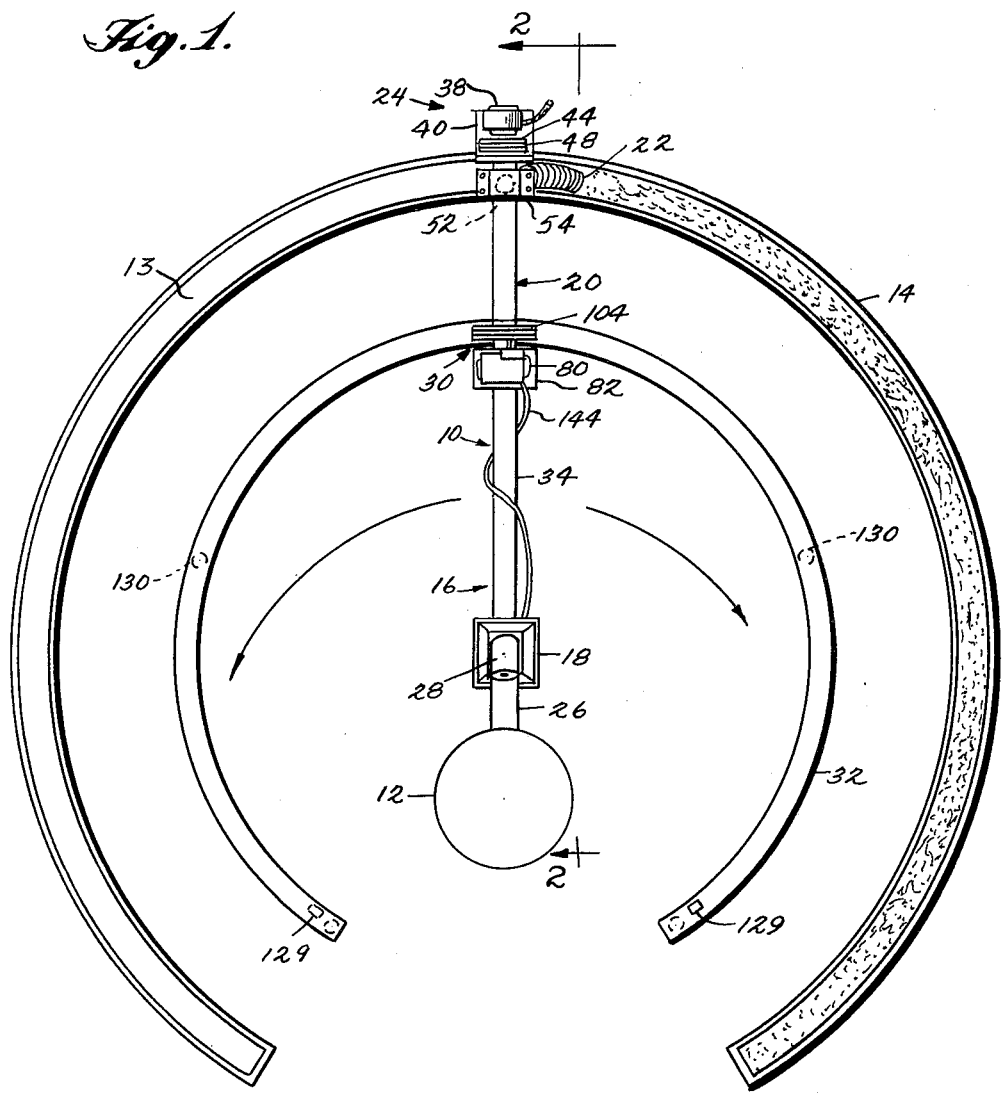

Sept. 14, 1965 H. L. FINE ETAL 3,205,859
OSCILLATING CONVEYOR BUNK FEEDER
Filed April 6, 1961 3 Sheets-Sheet 1

INVENTORS
HOMER L. FINE
LARRY D. MARK

BY Cushman, Darby & Cushman
ATTORNEYS

Sept. 14, 1965  H. L. FINE ETAL  3,205,859
OSCILLATING CONVEYOR BUNK FEEDER
Filed April 6, 1961  3 Sheets-Sheet 2
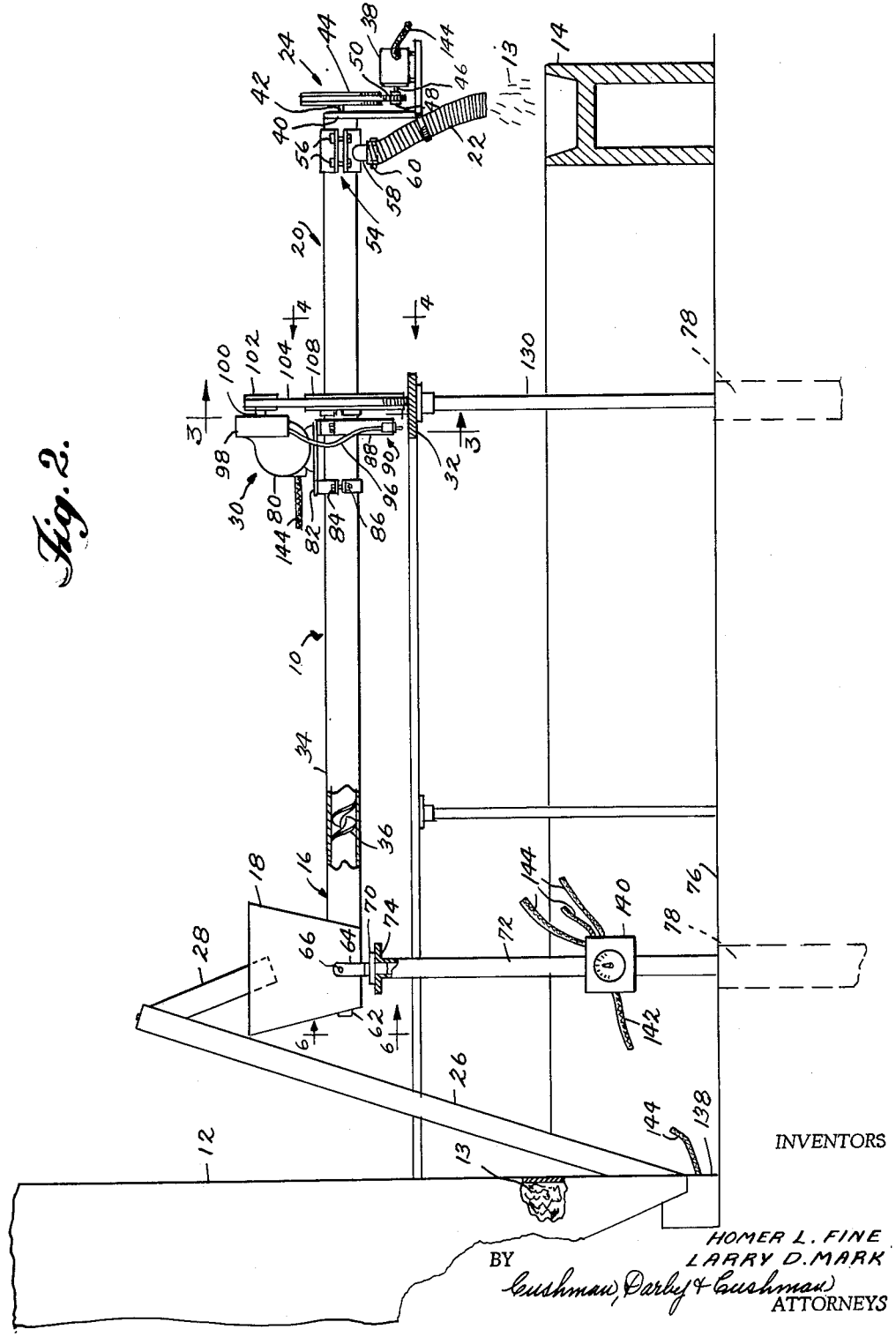
INVENTORS
HOMER L. FINE
LARRY D. MARK
BY Cushman, Darby & Cushman
ATTORNEYS Sept. 14, 1965 H. L. FINE ETAL 3,205,859
OSCILLATING CONVEYOR BUNK FEEDER
Filed April 6, 1961 3 Sheets-Sheet 3

INVENTORS
HOMER L. FINE
LARRY D. MARK
BY Cushman, Darby & Cushman
ATTORNEYS

United States Patent Office 3,205,859
Patented Sept. 14, 1965

3,205,859
OSCILLATING CONVEYOR BUNK FEEDER
Homer L. Fine, Rte. 1, Roca, Nebr., and Larry D. Mark,
J712 Arlington Towers, Arlington, Va.
Filed Apr. 6, 1961, Ser. No. 101,195
8 Claims. (Cl. 119—52)

This invention relates to automatic stock feeders of the type which convey solid feed from a storage bin to a feeding trough in preselected amounts and at preselected times. More in particular, it relates to a novel light weight stock feeder for periodically conveying feed from a bulk storage bin and distributing it uniformly along the length of a long feed through.

Stock feeding machines which automatically convey feed to a feed trough from a storage bin are known in the prior art. In these machines time-controlled switches and motors periodically operate suitable hopper valves and conveyors located between the bin and the trough for effecting delivery of the feed to the trough. In one type of known machine, the bin or the conveyor, or both, are located above the trough and extend substantially the length of the trough so as to be able to deposit feed along the length of the trough. Consequently this type of feeder is bulky in requiring the length of the bin, conveyor or both to equal the length of the trough. In another type of known feeder, the bin is mounted above the trough on a track for movement along the length of the trough. This construction requires that the entire bin and thus the total amount of feed to be moved along the track and therefore requires a heavy support structure and heavy duty motors for moving the bin. If the size of the bin is reduced in either of these types of machines in order to reduce the size of the supports, motors and conveyors, considerable labor and expense will be involved in their operation because of the smaller bin will require frequent filling. The construction of the present invention improves over these machines by providing a light-weight conveyor which will convey and distribute feed from a fixed bulk storage bin along a feed trough which is considerably longer than the conveyor. Since the bulk storage bin need be filled only at long intervals, the labor necessary to maintain the machine of the present invention in operation is small. The machine itself is light-weight and simple in construction and is therefore economical to construct and easy to install and maintain in remote farm areas. These advantages and improvements are obtained in the present invention by pivoting the inlet end of an elongated horizontal conveyor at a fixed bulk storage bin and by providing novel means for swinging the discharge end back and forth in a long arc above a curved feed trough. In particular, the novel means includes reversible traction means attached to the conveyor and adapted to frictionally engage a fixed track.

It is therefore a primary object of the present invention to provide an automatic feed distributing machine which materially reduces the labor required for maintaining the supply of feed to the machine.

A further object of the present invention is the provision of an automatic feed distributing machine which uniformly delivers feed along a long feed trough.

A further object of the present invention is the provision of an automatic feed distributing machine which is light-weight and simple in construction.

A further object of the present invention is the provision of an automatic material distributing machine having an elongated conveyor pivoted at its inlet end and having novel means for moving the discharge end of the conveyor in an arc above a material-receiving container.

These and other objects of the present invention will become more apparent during the course of reading the following detailed description and appended claims. The invention may be best understood with reference to the accompanying drawings wherein an illustrative embodiment is shown.

Figure 6:
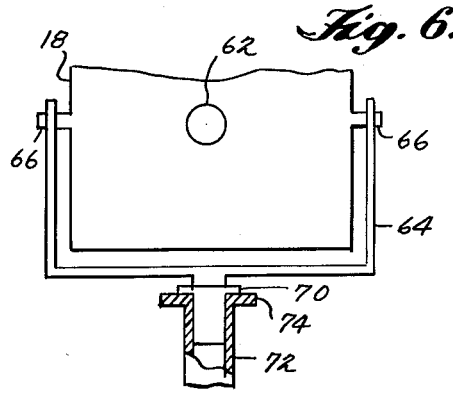
Figure 3:
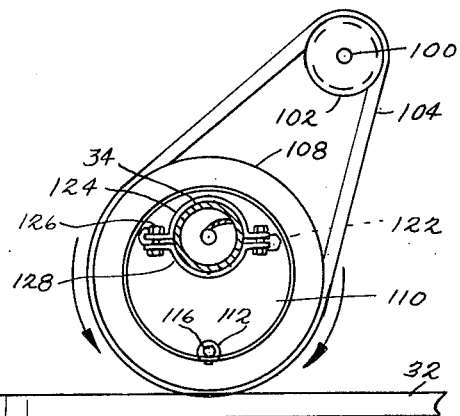
Figure 4:
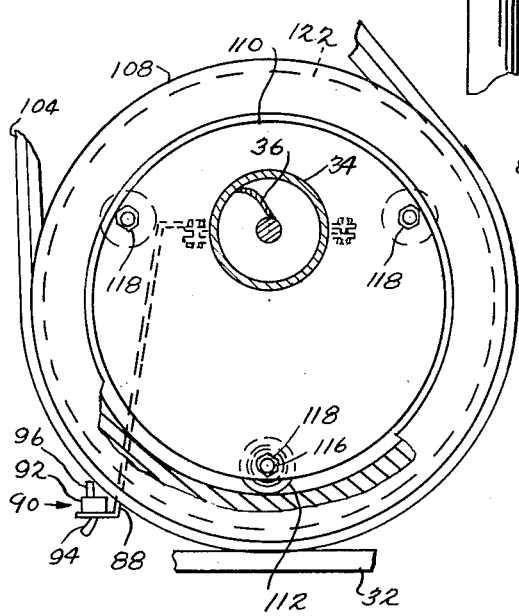
Figure 5:
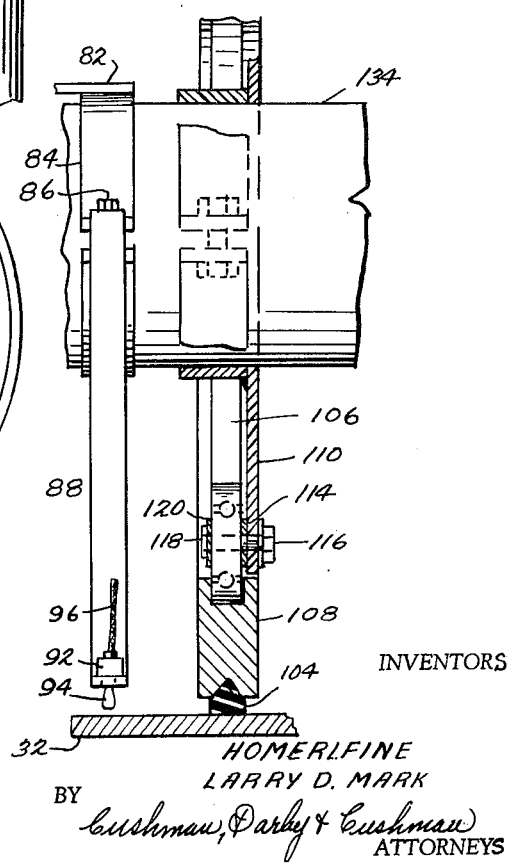

In the drawings:
FIGURE 1 is a top plan view of a stock feeder embodying the principles of the present invention;
FIGURE 2 is a side elevational view of the stock feeder taken on line 2—2 of FIGURE 1.
FIGURE 3 is a sectional view taken on the line 3—3 of FIGURE 2;
FIGURE 4 is a sectional view taken on line 4—4 of FIGURE 2;
FIGURE 5 is an enlarged fragmentary view partly broken away and partly in section of part of the stock feeder of FIGURE 1; and
FIGURE 6 is a sectional view on a reduced scale taken on the line 6—6 of FIGURE 2.

Referring now to the drawings there is shown therein an illustrative embodiment of the present invention which comprises an elongated pivoted screw-type conveyor 10, a cylindrical bulk feed storage bin 12 containing feed 13 and a curved feed trough 14. The conveyor 10 has an inlet portion 16 connecting with a hopper 18 and an outlet end portion 20 connecting with a flexible metal discharge pipe 22 and supporting a drive means 24 for the conveyor 10. A fixed screw-type conveyor 26 connects at its inlet end with the bottom of the bulk storage bin 12 and discharges through a discharge pipe 28 into the hopper 18. Intermediate the ends of the conveyor 10 and attached to the exterior thereof is a propelling means 30 resting on and movable along a curved horizontal supporting surface such as track 32.

The conveyor 10 includes a conveyor pipe 34 and a conveyor screw 36 inside the pipe and extending the length thereof. At its discharge end the screw 36 is journaled in a bearing (not shown) which is supported by an L-shaped frame 40 attached in any suitable manner to the discharge end of pipe 34. The frame 40 also supports a motor 38 which is attached thereto by any suitable means. A portion 42 of the shaft of the screw 36 extends through the bearing and connects with a drive wheel 44 which is driven by the motor 38 in a conventional manner throguh motor drive shaft 46, a pulley 48 and a belt 50.

The discharge end portion 20 of conveyor pipe 34 is provided with a discharge opening 52 in the lower surface thereof. A split ring clamp 54 having upper and lower halves connected by bolts 56 engages the exterior of conveyor pipe 34 at the location of discharge opening 52. The lower half of the split ring clamp has an opening therein which is in alignment with discharge opening 52 and has attached to its periphery one end of a short downwardly projecting length of rigid pipe 58. The upper end of flexible metal discharge pipe 22 fits over the lower end of rigid pipe 58 and is held in engagement therewith by bolts 60. A C-clamp engages the exterior of the flexible pipe 22 intermediate its ends and is fastened by any suitable means to the frame 40.

The inlet end portion 16 of the conveyor pipe 34 is fastened as by welding to the lower part of the hopper 18. Conveyor screw extends into the interior of the hopper and is suitably journaled in a bearing 62 supported by the hopper 18. As seen in FIGURE 6 the hopper is pivoted for slight movement in a vertical plane by means of a yoke 64, the arms of which project upwardly and cradle the hopper 18 between them on pins 66 attached to opposite sides of the hopper. The yoke 64 is provided with a central downwardly projecting cylindrical foot portion 68 having a circumferential flange 70. The lower end of foot portion projects into the upper end of a vertical support pipe 72 which has a circumferential end flange 74. The yoke and hopper are thus supported by the engagement of flange 70 with flange 74 and are pivotable about the coinciding axes of the foot portion 68 and the support pipe 72. The lower end of support pipe 72 is rigidly fixed in the ground 76 by setting it in cement 78.

The drive means 30 for rotating the conveyor 10 about the vertical axis through support pipe 72 includes a reversible electric motor 80 mounted in any suitable manner on the upper surface of a horizontal support plate 82 which in turn is mounted on the upper surfaces of two split ring clamps 84. The halves of the split ring clamps 84 are drawn together with bolts 86 and engage the exterior surface of conveyor pipe 34 intermediate its ends. As best seen in FIGURES 4 and 5, the forward split ring clamp 84 has attached to it by one of the bolts 86, a rigid strip 88 which extends downwardly to support a toggle-type reversing switch 90 for motor 80 at its lower end. The reversing switch 90 has a body portion 92 mounted rigidly on a horizontal portion of the strip 88 and a switch lever 94 projecting through an opening in the horizontal portion of the strip 88 and extending toward but spaced from the track 32. A cable 96 connects the reversing switch 90 with the reversible motor 80. A reduction drive 98 is mounted rigidly on the forward end of the motor 80 and has a drive shaft 100 and pulley 102 extending forwardly therefrom. A V-belt rides in the groove of the pulley and in a groove 106 in the periphery of a rotatable wheel 108 and engages along its outer periphery the upper surface of the track 32. As seen in FIGURES 3, 4 and 5, the wheel 108 is ring-shaped and is concentric with and slightly spaced from a circular fixed plate 110. Three conventional roller bearings 112 are equally spaced on the rear surface of the plate 110 near enough to the outer edge of the plate 110 so that a portion of the bearings extend radially beyond the edge of the plate. The bearings 112 are spaced from the rear surface of the plate 110 by washers 114 and are tightly held in place by bolts 116 which pass through the plate 110 and axially through the bearings. Nuts 118 engage the threaded ends of the bolts 116 and are spaced from the bearings 112 by washers 120. The portions of the bearings 112 which extend radially beyond the edge of the plate 110 ride in a groove 122 in the inner circumference of the wheel 108 whereby the wheel 108 is maintained slightly spaced from and freely rotatable about the plate 110. The conveyor pipe 34 passes through an opening in the plate 110, located above the center thereof, and is attached to the plate by means of a split ring clamp 124 and bolts 126. The lower half of the split ring clamp 124 is welded along its circumference to the rear surface of the plate 110 as at 128.

The track 32 along which the belt 104 of the propelling means 30 moves the conveyor 10 is constructed in an arc about the support pipe 72 and may be of any material which will provide traction for the belt 104. The track 32 may be constructed, for example, of ordinary wooden planks suitably supported from below. A block 129 is fastened to the upper surface of the track near each end at a position such that it will engage the switch lever 94 of the reversing switch 90. As shown in FIGURES 1 and 2, the track 32 is supported on a plurality of vertical support pipes 130 set in cement 78 in the ground 76 along the arcuate path of the drive means 30. On the upper end of each support pipe 130 is a flanged sleeve 132 which is fastened to the pipe with bolts 134 and to the lower surface of the track with bolts 136. The lengths of support pipes 130 and support pipe 72 are such that the track 32 and the conveyor 10 are positioned high enough to permit stock to feed along both sides of the trough 14.

The bulk storage bin 12 and fixed conveyor 26 are of conventional construction. As shown, bulk storage bin 12 is a large cylindrical container having a downwardly tapering bottom to which the inlet end of the fixed conveyor 26 is attached. An electrically operated drive means 138 for the fixed conveyor is connected to the screw of the fixed conveyor in any suitable manner.

A conventional timing device 140 is employed with the present invention for automatically and simultaneously actuating the various drive motors at preselected times. The timing device is mounted in any convenient location such as on support pipe 72. A cable 142 from a source of electric power (not shown) carries current to the timing device 140 and cables 144 carry the current at preselected times to the motors 38, 80 and 138.

The disclosed apparatus is put into operation by the timing device 140 which actuates motors 38, 80 and 138 simultaneously. Operation of the motor 138 drives the screw of the fixed conveyor 26 to carry the feed 13 from the bottom of bulk feed bin 12 to discharge pipe 28 through which the feed discharges into the hopper 18. Operation of motor 38 drives the screw of the pivoted conveyor 10 to carry the feed 13 from the hopper 18 to flexible discharge pipe 22 through which the feed discharges into feed trough 14. Simultaneously the motor 80 through the reduction drive 98 and pulley 102 drives the belt 104. As the belt moves between the pulley 102 and the wheel 108, the wheel 108 rotates on the bearings 112 and permits continuous movement of the belt 104. Traction between the moving belt and the upper surface of the track 32 causes the belt to travel along the track 32 carrying with its conveyor 10. Since the hopper is rigidly attached to the inlet portion 16 of the conveyor and is pivoted in the top of support pipe 72 by foot portion 68 of the yoke 64, the conveyor swings in an arc about the axis of the support pipe 72. When the conveyor 10 reaches an end of the track 32, the switch lever 94 is tripped by engagement with one of the blocks 129. Tripping of the switch lever 94 instantly causes the motor 80 to reverse its direction of rotation with the result that the belt 104 starts to move the conveyor 10 along the track in the opposite direction. When switch lever is tripped in the opposite direction by the other block 129, the motor 80 and belt 104 again reverse and move the conveyor toward the first block 129. Thus, the flexible discharge pipe 22 attached to the discharge end portion 20 of the conveyor 10 continually traverses the length of the feed trough 14 first in one direction and then in the opposite direction. Since the drive means 24 for the screw 36 of the conveyor 10 is actuated simultaneously with the drive means 30 for moving the belt 104, feed 13 is continuously deposited along the length of the trough 14 during the period determined by the timing device 140. Since the height of the track 32 may vary along its length due to settling of the support pipes 130 and 72 or other causes, the hopper is arranged for slight pivoting movement about a horizontal axis through pins 66 so as to prevent strains in the conveyor pipe 34 and in the flanges 70 and 74 during operation.

Thus, it is seen that after adjustment of the timing device 140, the apparatus will automatically deliver feed uniformly along the trough at predetermined intervals and for predetermined periods. The apparatus may operate, for example, several times per day, and will continue to deliver feed without supervision as long as the bulk feed bin contains feed. The size of the bin, number of cattle on feed and the daily feed requirements per head will, of course, determine the intervals between the filling of the bin. It is apparent, however, that the bin may be made quite large and will not require frequent filling. The size and simplicity of the conveyor 10 and drive means 30 are independent of the size of the bin and thus a light-weight and simple device will distribute a large amount of feed along a great length of trough.

While the bulk feed bin 12 has been shown with a fixed conveyor 26 for delivering feed to the hopper 18 of the pivoted conveyor 10, other means for delivering the feed to the pivoted conveyor 10 may be employed.

For example, the bin may be located directly above the hopper 18 so that feed is delivered into the hopper by gravity. In such an arrangement, an electrically-operated valve in the bottom of the bin would be opened by the timing device 140 when the drive means 24 and 30 are actuated.

It will be readily apparent that other modifications may be made in the disclosed embodiment of the invention without departing from the scope of the invention.

What is claimed is:

1. Animal feeding apparatus for conveying feed from a feed supply source to an animal feeding station comprising: an elongated feed conveyor having a feed inlet near one end and a feed outlet near the other end; fixed pivot means mounting said conveyor near its inlet end for rotation about a vertical axis; an arcuate, generally horizontal supporting surface horizontally spaced from said pivot means for supporting said conveyor near its outlet end, said outlet end being adjacent an arcuate animal feeding station; rotatable traction means mounted on said conveyor and engaging said supporting surface; electric-motor-operated, reversible drive means carried by said conveyor and drivingly connected to said rotatable traction means for moving the outlet end of said conveyor along said supporting surface in an arc about said fixed pivot means whereby feed may be deposited along the arcuate feeding station, said reversible drive means including a movable control element which when moved reverses the direction of rotation of said rotatable traction means; and trip means positioned at each end of said track so as to engage and move said control element upon arrival of said conveyor at each end of said track.

2. Animal feeding apparatus as in claim 1 wherein said drive means for moving said conveyor along said supporting surface includes a driven wheel and a freely rotatable wheel spaced therefrom and wherein said traction means comprises an endless belt having its inner circumference engaging the periphery of said wheels and having its outer circumference engaging said supporting surface.

3. Animal feeding apparatus as in claim 1 further including motor means for operating said conveyor carried by said conveyor.

4. Animal feeding apparatus as in claim 1 wherein said reversible drive means for moving said conveyor along said supporting surface includes a reversible electric motor and wherein said control element includes a switch for reversing said motor.

5. Animal feeding apparatus as in claim 1 further including ground-engaging support means supporting said horizontal supporting surface at a height above the ground such that the animals which are to be fed may pass freely under said conveyor at its discharge end.

6. Animal feeding apparatus as in claim 5 wherein said ground-engaging support means includes a plurality of spaced posts of relatively small transverse cross section, the spacing between posts being such that the animals to be fed may approach the feed station from either side without interference from said posts.

7. A bunk feeder mechanism for cattle comprising, an elongated arcuate bunk which is unobstructed along each side to permit cattle to have access thereto, a generally arcuate guide rail adjacent and above said bunk and generally coextensive in length therewith, a trolley carriage on said guide rail and movable therealong, an elongated feed conveyor arranged generally transversely to said bunk and having a feed discharge end supported by said carriage and a receiving end mounted at substantially the center of curvature of said rail for swinging movement of said conveyor generally horizontally along said bunk, said discharge end being located above said bunk for travel therealong as said conveyor swings along said bunk whereby feed is discharged by said conveyor into and along the length of said bunk, and propelling means on said carriage for engaging said arcuate rail whereby said conveyor is guided and driven along said rail.

8. A feeder for animals comprising, a generally arcuate bunk, a generally arcuate guide rail arranged above said bunk, a trolley carriage on said guide rail and movable therealong, a feed conveyor having a delivery end supported by said carriage and a receiving end mounted at substantially the center of curvature of said rail, and propelling means on said carriage having operative engagement with said rail.

References Cited by the Examiner

UNITED STATES PATENTS

| | | | |
|---|---|---|---|
| 1,222,219 | 4/17 | La Font | 198—125 X |
| 1,458,859 | 6/23 | Soderberg | 198—125 X |
| 1,462,078 | 7/23 | Williams et al. | 198—31.3 X |
| 1,487,001 | 3/24 | Williams | 198—31.3 |
| 2,685,863 | 8/54 | Martin | 119—51 |
| 2,735,400 | 2/56 | Stubbs | 119—18 |
| 2,786,448 | 3/57 | McMaster | 119—52 |
| 2,797,663 | 7/57 | Bailey | 119—52 |

ABRAHAM G. STONE, *Primary Examiner.*

CARL W. ROBINSON, ARNOLD RUEGG, *Examiners.*